United States Patent
Simha et al.

(10) Patent No.: US 10,095,863 B2
(45) Date of Patent: Oct. 9, 2018

(54) AUTOMATING MONITORING OF A COMPUTING RESOURCE IN A CLOUD-BASED DATA CENTER

(71) Applicants: Ajeya Hindupur Simha, Bangalore (IN); Adarsh Suparna, Bangalore (IN); HEWLETT-PACKARD DEVELOPMENT COMPANY, L.P., Houston, TX (US)

(72) Inventors: Ajeya Hindupur Simha, Bangalore (IN); Adarsh Suparna, Bangalore (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 14/909,203

(22) PCT Filed: Aug. 14, 2013

(86) PCT No.: PCT/IN2013/000501
§ 371 (c)(1),
(2) Date: Feb. 1, 2016

(87) PCT Pub. No.: WO2015/022696
PCT Pub. Date: Feb. 19, 2015

(65) Prior Publication Data
US 2016/0188877 A1 Jun. 30, 2016

(51) Int. Cl.
*G06F 21/55* (2013.01)
*H04L 29/06* (2006.01)
(Continued)

(52) U.S. Cl.
CPC ........ *G06F 21/554* (2013.01); *G06F 9/45558* (2013.01); *G06F 9/5072* (2013.01);
(Continued)

(58) Field of Classification Search
CPC .. G06F 21/554; G06F 9/5072; G06F 9/45558; G06F 21/552; G06F 2209/508;
(Continued)

(56) References Cited

U.S. PATENT DOCUMENTS 7,647,288 B2  1/2010  Friedlander et al.
8,156,553 B1  4/2012  Church et al.
(Continued)

FOREIGN PATENT DOCUMENTS

CN  101937368 A  1/2011
CN  102216922 A  10/2011
(Continued)

OTHER PUBLICATIONS

Hwang, Kai, and Deyi Li. "Trusted cloud computing with secure resources and data coloring." IEEE Internet Computing 14.5 (2010): 14-22.*
(Continued)

*Primary Examiner* — Chau Le
(74) *Attorney, Agent, or Firm* — Mannava & Kang, P.C.

(57) ABSTRACT

Provided is a method of identifying a computing resource requiring monitoring for a security purpose in a cloud-based data center during creation of a service template involving the computing resource. The identified computing resource is depicted in the service template. Upon receipt of a request for creating a service instance based on the service template, the service instance is created based on the service template and the identified computer resource is simultaneously monitored for the security purpose.

19 Claims, 3 Drawing Sheets

(51) Int. Cl.
  *H04L 29/08* (2006.01)
  *G06F 9/455* (2018.01)
  *G06F 9/50* (2006.01)
(52) U.S. Cl.
  CPC .......... *G06F 21/552* (2013.01); *H04L 63/145* (2013.01); *H04L 63/1433* (2013.01); *H04L 63/1458* (2013.01); *H04L 63/1483* (2013.01); *H04L 67/10* (2013.01); *G06F 2009/45595* (2013.01); *G06F 2209/508* (2013.01)
(58) Field of Classification Search
  CPC ....... G06F 2009/45595; H04L 63/1433; H04L 63/1483; H04L 63/1458; H04L 67/10; H04L 63/145
  See application file for complete search history.

(56) References Cited

U.S. PATENT DOCUMENTS

| | | | |
|---|---|---|---|
| 9,069,930 B1* | 6/2015 | Hart | G06F 21/00 |
| 9,491,050 B2* | 11/2016 | Shetty | H04L 41/0806 |
| 2005/0022027 A1* | 1/2005 | Bonn | H04L 29/06 726/4 |
| 2005/0050378 A1* | 3/2005 | Liang | G06F 21/56 714/4.11 |
| 2009/0089879 A1 | 4/2009 | Wang et al. | |
| 2009/0228950 A1 | 9/2009 | Reed et al. | |
| 2010/0088150 A1* | 4/2010 | Mazhar | G06F 9/5088 717/120 |
| 2011/0083122 A1 | 4/2011 | Chen et al. | |
| 2012/0066670 A1* | 3/2012 | McCarthy | G06F 9/5072 717/169 |
| 2012/0246303 A1 | 9/2012 | Petersen et al. | |
| 2013/0254878 A1* | 9/2013 | Clarke | G06F 15/16 726/22 |
| 2013/0282798 A1* | 10/2013 | McCarthy | G06F 9/5072 709/203 |
| 2014/0201735 A1* | 7/2014 | Kannan | G06F 9/45558 718/1 |
| 2014/0317737 A1* | 10/2014 | Shin | H04L 63/1408 726/23 |
| 2016/0342500 A1* | 11/2016 | Boia | G06F 11/3684 |

FOREIGN PATENT DOCUMENTS

| | | |
|---|---|---|
| CN | 102467637 | 5/2012 |
| CN | 103065086 B | 4/2013 |
| CN | 103154961 A | 6/2013 |
| CN | 103198253 A | 7/2013 |
| CN | 103210395 B | 7/2013 |

OTHER PUBLICATIONS

Rimal, Bhaskar Prasad, Eunmi Choi, and Ian Lumb. "A taxonomy and survey of cloud computing systems." INC, IMS and IDC (2009): 44-51.*

Subashini, Subashini, and Veeraruna Kavitha. "A survey on security issues in service delivery models of cloud computing." Journal of network and computer applications 34.1 (2011): 1-11.*

Pearson et al., "Privacy and Security for Cloud Computing", Computer Communications and Networks, Published 2013, Retrieved From http://www.springer.com/series/4198.*

International Search Report and Written Opinion, PCT Patent Application No. PCT/IN2013/000501, May 19, 2014, 13 pages.

Lee, Jun-Ho, et al., Multi-level Intrusion Detection System and Log Management in Cloud Computing, Sungkyunkwan University, Dec. 15, 2010, 4 pages.

Unknown, ActiveGuard Security and Compliance Platform, Solutionary, Inc., Apr. 2013, 2 pages.

* cited by examiner

AUTOMATING MONITORING OF A COMPUTING RESOURCE IN A CLOUD-BASED DATA CENTER

CROSS-REFERENCE TO RELATED APPLICATION

This application is a U.S. National Stage Application of and claims priority to international Patent Application No. PCT/IN2013/000501, filed on Aug. 14, 2013, and entitled "Automating Monitoring Of A Computing Resource In A Cloud-Based Data Center".

BACKGROUND

Cloud computing has evolved as an alternate model to regular computing operations of an enterprise. Generally speaking, cloud computing involves delivery of computing as a service rather than a product, whereby shared resources (software, storage resources, etc.) are provided to computing devices as a service. The resources are shared over a network, which is typically the Internet. Cloud computing provides easy and scalable access to computing resources and information technology (IT) services.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

Figure 1:
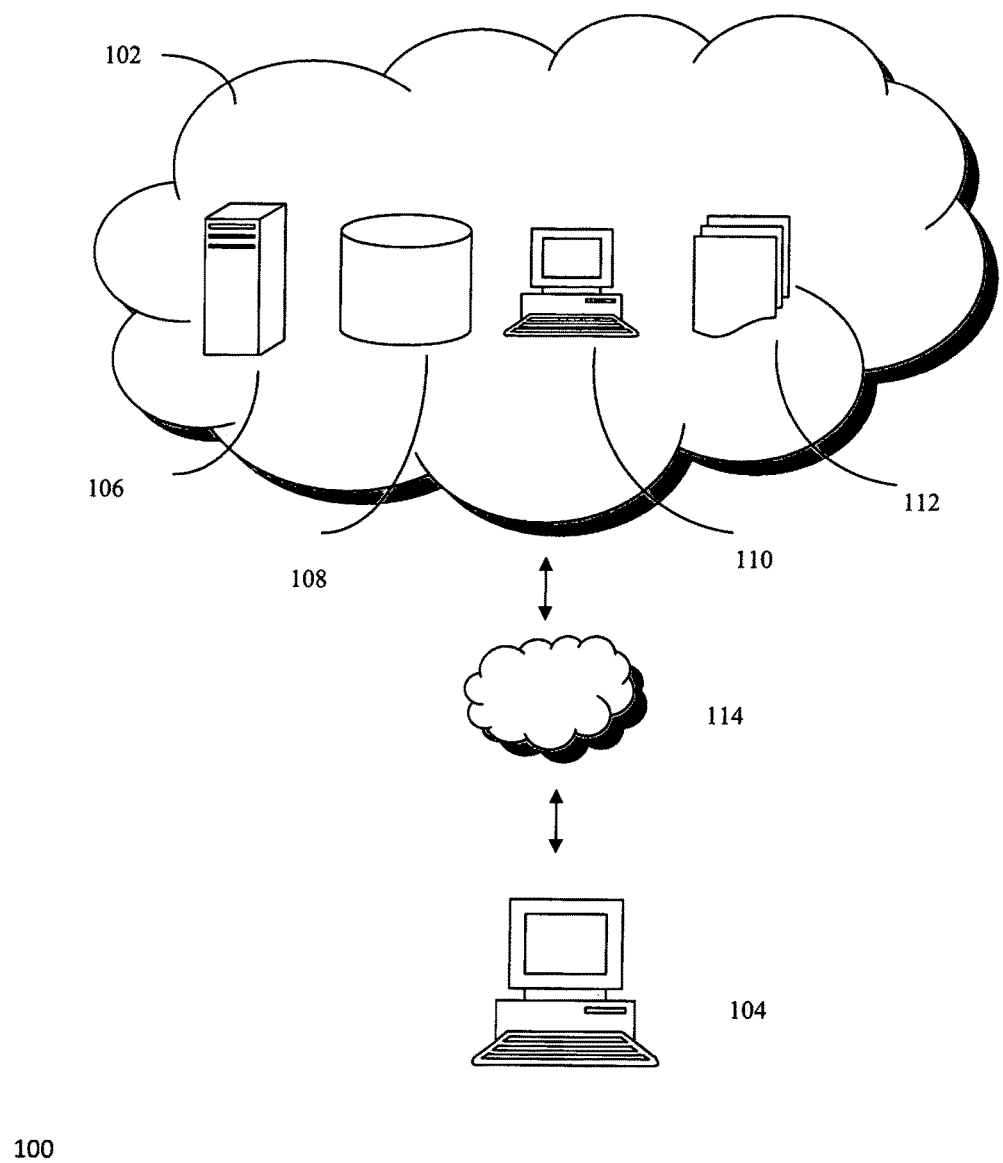
FIG. 1 illustrates a system for automating monitoring of a computing resource in a cloud-based data center, according to an example.

With the advent of cloud computing there's a paradigm shift in the way datacenters are perceived by an enterprise. It is no longer necessary for a business to own, maintain and operate personal data servers and applications. Cloud-based datacenter providers offer computing resources such as software, storage resources, network resources, memory resources, processing resources, etc. to their clients who could either purchase or rent them depending upon their needs.

One of the key technologies used in cloud-based datacenters is virtualization. Virtualization allows creation of a virtual version of a resource, such as an operating system, a hardware platform, storage resource etc. which could be shared, for instance, among different clients. A virtual machine (VM) is a software implementation of a machine that executes programs like a physical machine. It can be used to perform a variety of tasks such as hosting of multiple operating systems on a physical machine at the same time, testing of a new application on multiple platforms, and server consolidation. Multiple virtual machines can be created on a host device or server. Thus, a virtual machine could also be offered as a computing resource in a cloud-based datacenter.

Security Information & Event Management (SIEM) is one of the key parameters to be monitored in a datacenter. With ever increasing securing threats, security management poses a significant challenge in a cloud-based data center as it is a dynamic environment where computing resources (such as virtual machines, applications, etc.) may be deployed and removed on demand by customers. It is no mean task therefore to manage security aspects of such actively changing ecosystem of computing resources. A security engineer may be required to monitor, aggregate and/or correlate data from multiple sources in order to identify a security breach. Needless to say, a manual monitoring in such scenario could be a daunting task especially when security management aspects are well defined in a Service Level Agreement (SLA) between a cloud service provider and customer.

For the sake of clarity, the term "computing resource" may refer to include software and hardware components that are accessible locally and/or over a network. Some non-limiting examples of a computing resource may include software (such as applications, file utilities, etc.), storage resources (for example, disk drives, magnetic tapes, etc.), network resources, memory resources, processing resources, and the like.

Proposed is solution for automating monitoring of a computing resource in a cloud-based data center. The method comprises identifying a computing resource requiring monitoring for a security purpose in the cloud-based data center during creation of a service template involving the computing resource. The identified computing service is captured in the service template. Once a request for creating a service instance based on the service template is received, the service instance is created and the identified computer resource is simultaneously monitored for the security purpose.

FIG. 1 illustrates a system 100 for automating monitoring of a computing resource in a cloud-based data center, according to an example.

System 100 comprises cloud-based data center 102 and user (customer) computer system 104.

Cloud-based data center 102 includes computing resources 106, 108, 110 and 112. Computing resources 106, 108, 110 and 112 may be hardware resources, software resources, or any combinations thereof. For example, hardware resources may include computer systems, computer servers, workstations, or any other computer devices. Software resources may include operating system software (machine executable instructions), firmware, and/or application software. Computing resources may also include virtual machines, virtual servers, storage resources, load balancers, firewalls, etc. In an implementation, some or all of the computing resources available in cloud-based data center 102 may be utilized by a user (customer), for instance, through user computer system 104, which may be communicatively coupled to cloud-based data center 102 computer network 114. Computer network 114 may be a physical or wireless network, and may include connections, such as wire, wireless communication links, or fibre optic cables. In an implementation, computer network 114 is the Internet.

User computer system 104 may be, for example, a computer server, desktop computer, notebook computer, tablet computer, mobile phone, personal digital assistant (PDA), or the like. User computer system 104 may include a processor for executing machine readable instructions and a memory (storage medium) for storing machine readable instructions.

Although a single user computer system 104 is illustrated in FIG. 1, other embodiments may include additional user computers systems which may be communicatively coupled to cloud-based data center 102.

In an example, cloud-based data center 102 provides any or all of computing resources 106, 108, 110 and 112 to user computer system 104 and charges user computer system 104 based on usage. Cloud-based data center 102 may a private cloud, public cloud or hybrid cloud.

It would be appreciated that the system components depicted in FIG. 1 are for the purpose of illustration only and the actual components may vary depending on the computing system and architecture deployed for implementation of the present solution. The various components described above may be hosted on a single computing system or multiple computer systems, including servers, connected together through suitable means.

Figure 2:
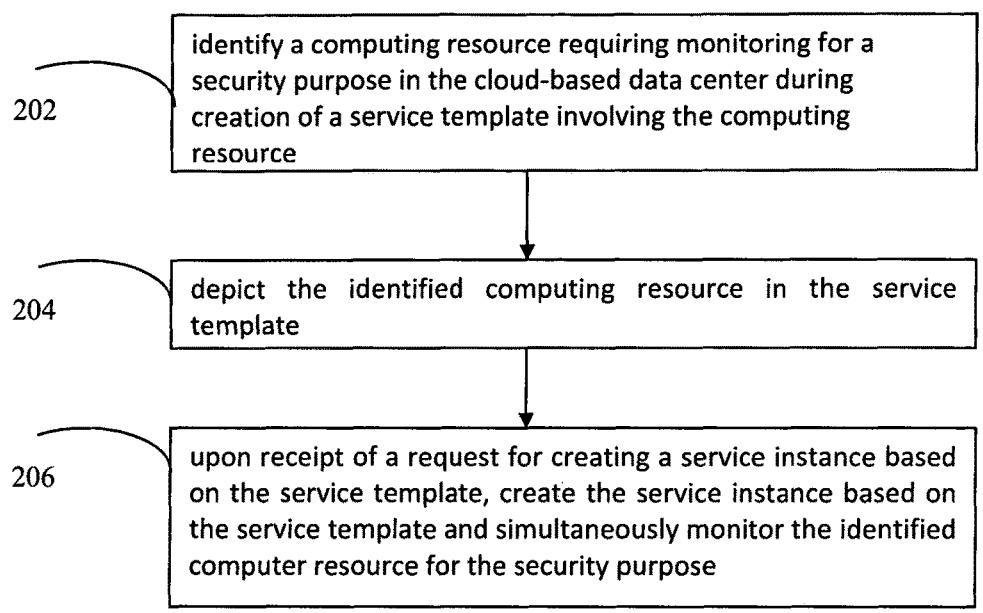
FIG. 2 illustrates a flow chart of a method of automating monitoring of a computing resource in a cloud-based data center, according to an example.

FIG. 2 illustrates a flow chart of a method of automating monitoring of a computing resource in a cloud-based data center, according to an example. At block 202 a computing resource that requires monitoring for a security purpose in a cloud-based data center is identified during creation of, a service template involving the computing resource. As mentioned earlier, a cloud-based data center may include a number of computing resources such as virtual machines, virtual servers, storage resources, applications, etc. In view of ever present security threats (such as viruses, worms, hacking, phishing, security attacks like Denial of Service, etc.), a user (or customer) of a cloud-based data center may require the data center service provider to monitor its computing resource(s) in order to prevent such threats or attacks. In an example, security related expectations of a user with regards to usage of a computing resource in a cloud-based data center may be defined as security management policies or parameters in a Service Level Agreement (SLA) with the data center provider.

Figure 3:
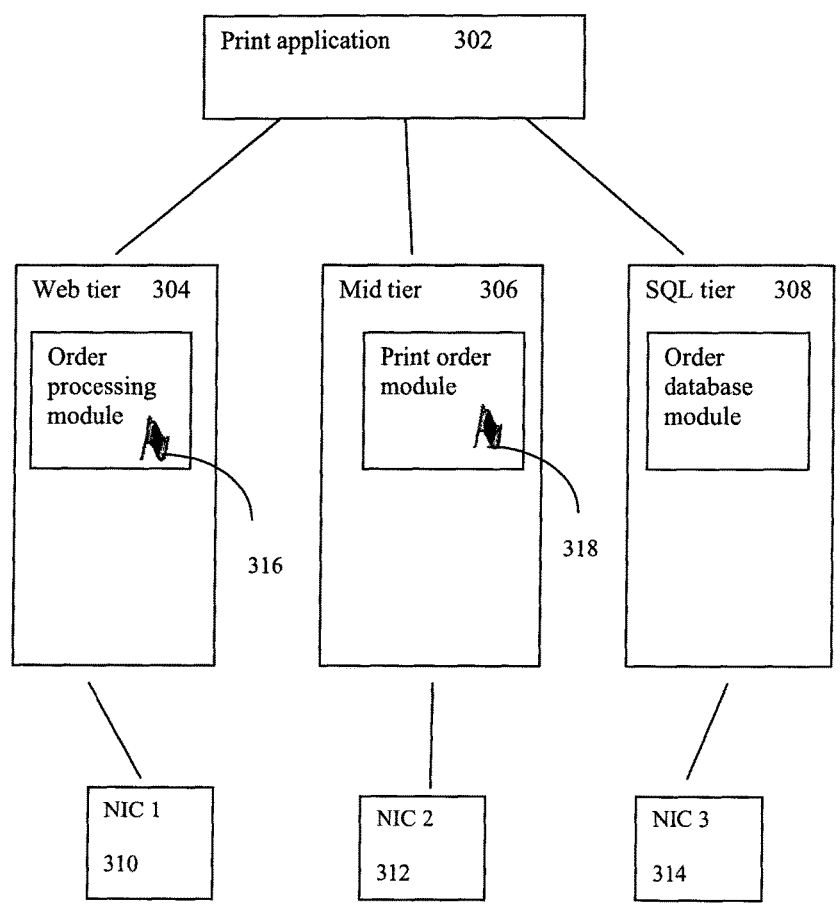
FIG. 3 illustrates a service template, according to an example.

In order to address security issues related to a computing resource in a cloud-based data center, a user (for example, a security designer) may identify a computing resource(s) that requires monitoring for a security purpose at the time of designing of a service template involving the computing resource. In a cloud computing environment, a service template is a blueprint that captures all those resources that are needed to deploy an application. For instance, a service template may capture an application's architecture, configuration details, tasks, processes, tools etc. that are required to deploy, configure, and substantiate an instance of an application. It is typically prepared by an individual (for example, a service designer) who may be associated with a cloud-based data center provider or customer. FIG. 3 illustrates a service template 300, according to an example. Service template 300 represents a three-tier print application 302 comprising a web tier 304, a mid tier 306, and a SQL tier 308. Each tier is a virtual machine (VM) template that includes OS profile, hardware profile, application profile, database profile, etc. Web tier 304 includes a front end print order module, mid tier 306 includes an order processing module, and SQL tier includes 308 an order database of the print application 302. Service template 300 also captures network resources 310, 312, and 314 that are required to deploy the three-tier print application 302.

A service template thus may capture all those computing resources that are required to successfully deploy an application. Once the resources defined, in a service template are validated, for instance for usage, an application can be deployed by substantiating an instance of the service template. In an example, a service template may be represented in the form of a Graphical User Interface (GUI).

Block 202 envisages that all those computing resources of a cloud-based data center that requires monitoring for a security purpose (for example, due to an implicit monitoring requirement or a customer need) should be identified at the time of designing of a service template involving the computing resources. To provide an illustration in the context of FIG. 3, if it is determined that front end print order module of web tier 304 should be monitored (for example, for ascertaining an invalid user login) along with order processing module of mid tier 206 (for example, for a virus attack) then both of these modules may be identified during the creation of a service template that involves using such modules.

In an example, the identified computing resources may serve as "log message sources" or "log sources" for monitoring purposes. A computing resource may generate log messages that capture various events associated with the computing resources' operations. The aforesaid events may include system error messages, system startups, system shutdowns, attacks, login attempts, security or authorization events, etc. Typically these messages are recorded in the form of a log file, which generally is a text file.

At block 204, the computing resource which is identified for monitoring for a security purpose in the cloud-based data center is depicted (or highlighted) in the service template. In other words, all those computing resources that are considered relevant for security related monitoring (for example, due to an SLA requirement) in a cloud-based data center are identified and shown in the service template. The aforesaid activity may be performed by a security expert.

In an example, labels (for instance, a flag) may be used to depict the computing resources identified for monitoring in the service template. To provide an illustration in the context of FIG. 3, if it is determined that front end print order module of web tier 304 should be monitored along with order processing module of mid tier 206 then both these modules may be identified or depicted with labels (316 and 318) in the service template. Thus, labels help in recognition of computing resources that have been identified for security related monitoring.

At block 206, upon receipt of a request from a user for creating a service instance based on the service template, the cloud-based data center creates the service instance and simultaneously initiates monitoring of the identified computer resource (in the service template) for a security purpose. In other words, once a service template for deploying an application has been created, wherein the service template identifies those computing resources that require monitoring for security purposes, a future request from a user for creating a service instance based on aforesaid service template creates the service instance for the user. In addition, upon receipt of said request from the user, monitoring of computing resources that were identified in the service template for security related monitoring is also initiated. In other words, the cloud-based data center leverages the pre-identified computing resources in a service template to begin their monitoring when a request for creating an instance of a service (application) based on the service template is received from a user.

In an example, initiating monitoring of identified computer resources for a security purpose(s) involves monitoring of log messages (or log files) generated by the identified computing resources. The cloud-based data center scans the log messages generated by said computing resources to identify a security related issue, threat or attack. Thus, log management of identified computing resources is enabled as soon as a service instance is deployed. Monitoring of computing resources may require interpretation of events generated during the course of operation of those computing resources. In such case, the results of monitoring may be shared with a monitoring application such as a log management application.

It is also intended that if a cloud-based data center user deletes a service instance (for example, since it is no longer required), the monitoring of identified computing resources may be discontinued.

Proposed solution integrates security monitoring of computing resources into a service template thereby eliminating the manual effort required in configuration of said resources post deployment of a service instance in a cloud-based data center. Since the proposed solution can be integrated into the workflow of a service instance deployment, the possibility of missing an issue related to compliance, governance or security is either eliminated or reduced.

For the sake of clarity, the term "module", as used in this document, may mean to include a software component, a hardware component or a combination thereof. A module may include, by way of example, components, such as software components, processes, tasks, co-routines, functions, attributes, procedures, drivers, firmware, data, databases, data structures, Application Specific Integrated Circuits (ASIC) and other computing devices. The module may reside on a volatile or non-volatile storage medium and configured to interact with a processor of a computer system.

It should be noted that the above-described embodiment of the present solution is for the purpose of illustration only. Although the solution has been described in conjunction with a specific embodiment thereof, numerous modifications are possible without materially departing from the teachings and advantages of the subject matter described herein. Other substitutions, modifications and changes may be made without departing from the spirit of the present solution.

The invention claimed is:

1. A method of automating monitoring of a computing resource in a cloud-based data center, comprising:
   identifying a computing resource requiring monitoring for a security purpose in the cloud-based data center during creation of a service template involving the computing resource;
   depicting, by a processor, the identified computing resource in the service template; and
   in response to receipt of a request for creating a service instance based on the service template, creating the service instance based on the service template and simultaneously monitoring, by the processor, the identified computer resource depicted in the service template for the security purpose, including monitoring log messages generated by the identified computer resource and scanning the log messages to identify a security threat or attack.

2. The method of claim 1, wherein depicting the identified computing resource in the service template including labeling the identified computing resource with a mark in the service template.

3. The method of claim 1, wherein the cloud is a private cloud, a public cloud or a hybrid cloud.

4. The method of claim 1, wherein the service template is represented in a Graphical User Interface (GUI).

5. The method of claim 1, wherein the identifying of the computing resource requiring monitoring for the security purpose in the cloud-based data center is in response to a selection by a user.

6. The method of claim 1, wherein the computing resource is a virtual machine.

7. The method of claim 1, wherein the computing resource is a computer application or operating system.

8. The method of claim 1, wherein the computing resource is a log file.

9. The method of claim 1, further comprising discontinuing monitoring of the identified computer resource for the security purpose in response to a deletion of the service instance based on the service template.

10. The method of claim 1, further comprising reporting results of monitoring the identified computer resource to a monitoring application.

11. The method of claim 1, wherein the request for creating the service instance based on the service template is received from a user of the cloud-based data center.

12. The method of claim 1, wherein a user creates the service template involving the computing resource.

13. A method of automating monitoring of a log source in a cloud-based data center, comprising:
    identifying the log source requiring monitoring for a security purpose in the cloud-based data center in a service template involving the log source;
    highlighting the identified log source in the service template; and
    in response to receipt of a user's request for creating a service instance based on the service template, creating the service instance based on the service template and initiating monitoring of the identified log source highlighted in the service template for the security purpose, including monitoring log messages generated by the identified log source and scanning the log messages to identify a security threat or attack.

14. The method of claim 13, wherein highlighting the identified log source in the service template includes depicting a flag at the identified log source in the service template.

15. The method of claim 14, wherein monitoring for security purpose includes monitoring for one of the following: a virus, a worm, hacking, phishing, and Denial of Service (DoS) attack.

16. A non-transitory computer readable medium storing instructions that when executed by a processor cause the processor to:
    identify a computing resource in a cloud-based data center that requires monitoring for a security purpose during creation of a service template involving the computing resource;
    depict the identified computing resource in the service template; and
    in response to receipt of a request for creating a service instance, create the service instance based on the service template and monitor the identified computer resource depicted in the service template for the security purpose,
    wherein to monitor the identified computer resource, the instructions are to cause the processor to monitor log messages generated by the identified computer resource and scan the log messages to identify a security threat or attack.

17. The non-transitory computer readable medium of claim 16, wherein to depict the identified computing resource in the service template, the instructions are to cause the processor to label the identified computing resource in the service template with a flag.

18. The non-transitory computer readable medium of claim 16, the instructions are to cause the processor to discontinue the monitoring of the identified computer resource in response to a deletion of the service instance.

19. The non-transitory computer readable medium of claim 16, wherein the instructions are to cause the processor to: report results of monitoring the identified computer resource to a monitoring application.

\* \* \* \* \*